(12) United States Patent
Benson et al.

(10) Patent No.: US 9,848,063 B2
(45) Date of Patent: Dec. 19, 2017

(54) FACILITATING COMMUNICATION BETWEEN SMART OBJECT AND APPLICATION PROVIDER

(71) Applicant: Exosite LLC, Minneapolis, MN (US)

(72) Inventors: Mark Dennis Benson, Plymouth, MN (US); Hans Aaron Rempel, Minneapolis, MN (US); Dominic Immanuel Letz, Taichung (TW)

(73) Assignee: Exosite LLC, Minneapolis, MN (US)

( * ) Notice: Subject to any disclaimer, the term of this patent is extended or adjusted under 35 U.S.C. 154(b) by 92 days.

(21) Appl. No.: 14/640,770

(22) Filed: Mar. 6, 2015

(65) Prior Publication Data
US 2015/0256651 A1    Sep. 10, 2015

Related U.S. Application Data

(60) Provisional application No. 61/950,082, filed on Mar. 8, 2014.

(51) Int. Cl.
| | |
|---|---|
| *H04W 84/12* | (2009.01) |
| *H04L 12/28* | (2006.01) |
| *H04L 29/06* | (2006.01) |
| *H04L 29/08* | (2006.01) |

(52) U.S. Cl.
CPC .............. *H04L 67/42* (2013.01); *H04L 67/02* (2013.01); *H04L 67/10* (2013.01); *H04L 67/125* (2013.01); *H04L 67/322* (2013.01)

(58) Field of Classification Search
CPC ......... H04L 29/06; H04L 29/08; H04L 67/42; H04L 67/10; H04L 67/125; H04L 12/28; H04W 84/12
See application file for complete search history.

(56) References Cited

U.S. PATENT DOCUMENTS

| | | | |
|---|---|---|---|
| 8,494,576 B1 | 7/2013 | Bye et al. | |
| 2003/0074453 A1* | 4/2003 | Ikonen | H04L 29/06 709/228 |
| 2007/0180075 A1* | 8/2007 | Chasman | G06F 17/30575 709/223 |
| 2007/0271354 A1* | 11/2007 | Zhang | H04L 63/0892 709/217 |
| 2008/0126831 A1* | 5/2008 | Downey | G06F 11/008 714/4.2 |

(Continued)

FOREIGN PATENT DOCUMENTS

| | | |
|---|---|---|
| EP | 2096829 A1 | 9/2009 |
| WO | 2013045924 A1 | 4/2013 |

OTHER PUBLICATIONS

PCT International Searching Authority, The International Search Report and Written Opinion dated May 29, 2015 for International Application No. PCT/US2015/019264, 10 pages.

*Primary Examiner* — Andrew Lee
(74) *Attorney, Agent, or Firm* — Merchant & Gould P.C.

(57) ABSTRACT

A smart object establishes communication with an application provider server computing device by sending a request to a manufacturer server computing device to identify a second server computing device; receiving a response from the first server computing device with an identifier indicating the second server computing device; and using the identifier to establish communication between the smart object and the second server computing device.

20 Claims, 15 Drawing Sheets

(56) References Cited

U.S. PATENT DOCUMENTS

| | | | |
|---|---|---|---|
| 2009/0055524 A1* | 2/2009 | Tokunaga | G06Q 10/02 709/224 |
| 2009/0204711 A1* | 8/2009 | Binyamin | H04L 67/16 709/226 |
| 2011/0060790 A1* | 3/2011 | Subramanian | G06F 9/541 709/203 |
| 2011/0084800 A1 | 4/2011 | Ko et al. | |
| 2011/0252235 A1* | 10/2011 | Dolan | H04L 29/12801 713/168 |
| 2011/0320430 A1* | 12/2011 | Coupe | G06F 17/30884 707/711 |
| 2012/0051542 A1* | 3/2012 | Kim | G01D 4/004 380/255 |
| 2012/0259956 A1* | 10/2012 | Jawalkar | H04L 67/1029 709/219 |
| 2013/0103780 A1 | 4/2013 | Panther | |
| 2014/0045452 A1* | 2/2014 | Ma | H04W 4/005 455/406 |
| 2014/0258366 A1* | 9/2014 | L'Heureux | H04L 29/08 709/203 |

\* cited by examiner

| MEASUREMENT DATA 262 | | | |
|---|---|---|---|
| DATE/TIME | TEMPERATURE | HUMIDITY | |
| 2014-01-01 12:00:05 | 56 °F | 45 % | ⋮ |
| 2014-01-01 12:10:05 | 58 °F | 42 % | ⋮ |
| ...... | ...... | ...... | ⋮ |

| PRIORITY | SERVER ID |
|---|---|
| 1 | SERVICE SERVER A |
| 2 | SERVICE SERVER B |
| 3 | SERVICE SERVER C |

*FIG. 12*

FACILITATING COMMUNICATION BETWEEN SMART OBJECT AND APPLICATION PROVIDER

CROSS-REFERENCE TO RELATED APPLICATION

This application claims priority to U.S. Application No. 61/950,082, filed on Mar. 8, 2014, titled FACILITATING COMMUNICATION BETWEEN SMART OBJECT AND APPLICATION PROVIDER, the disclosure of which is hereby incorporated by reference in its entirety.

BACKGROUND

Many everyday objects now include network capabilities. For example, these objects may connect to a server on the Internet to record status information or measurements that relate to the object. Additionally, the objects can receive information, instructions, and new software from the server as well. For example, using this capability, a manufacturer may deploy a firmware upgrade for some of the objects without requiring any user interaction with the object by its owner.

Generally, these network-enabled objects generate machine-to-machine communication. That is, one machine, the object, communicates with another machine, the server. However, this machine-to-machine communication is only possible when the object and the server are able to connect to one another through a network.

SUMMARY

In general terms, this disclosure is directed to facilitating communication between a smart object and an application provider computing system. In one possible configuration and by non-limiting example, the smart object initially communicates with a first server computing device. The first server computing device identifies for the smart object an application provider computing device that can be used for subsequent communication. Various aspects are described in this disclosure, which include, but are not limited to, the following aspects.

One aspect is a method of establishing communication between a smart object and an application provider server computing device, the method comprising: sending a request from the smart object to a first server computing device; receiving, by the smart object, a response from the first server computing device, the response including a first identifier indicating the second server computing device; and establishing communication between the smart object and the second server computing device based upon the first identifier, wherein the second server computing device provides services associated with the smart object.

Another aspect is a smart object comprising: a functional object configured to perform a function; a sensor system configured to measure a property of the functional object; and a network communication engine comprising: a central processing unit that is configured to control the network communication engine; a computer readable data storage medium storing software instructions that, when executed by the central processing unit, cause the network communication engine to: send a request to a first server computing device, the request configured for identifying a second server computing device; receive a response from the first server computing device, the response including a first identifier indicating the second server computing device; and establish communication with the second server computing device based upon the first identifier, wherein the second server computing device provides services associated with the smart object.

BRIEF DESCRIPTION OF THE DRAWINGS

FIG. 9 illustrates an example measurement data obtained at the smart object of FIG. 3.

FIG. 12 illustrates an example priority list of application provider server computing devices with different priority.

DETAILED DESCRIPTION

Figure 1:
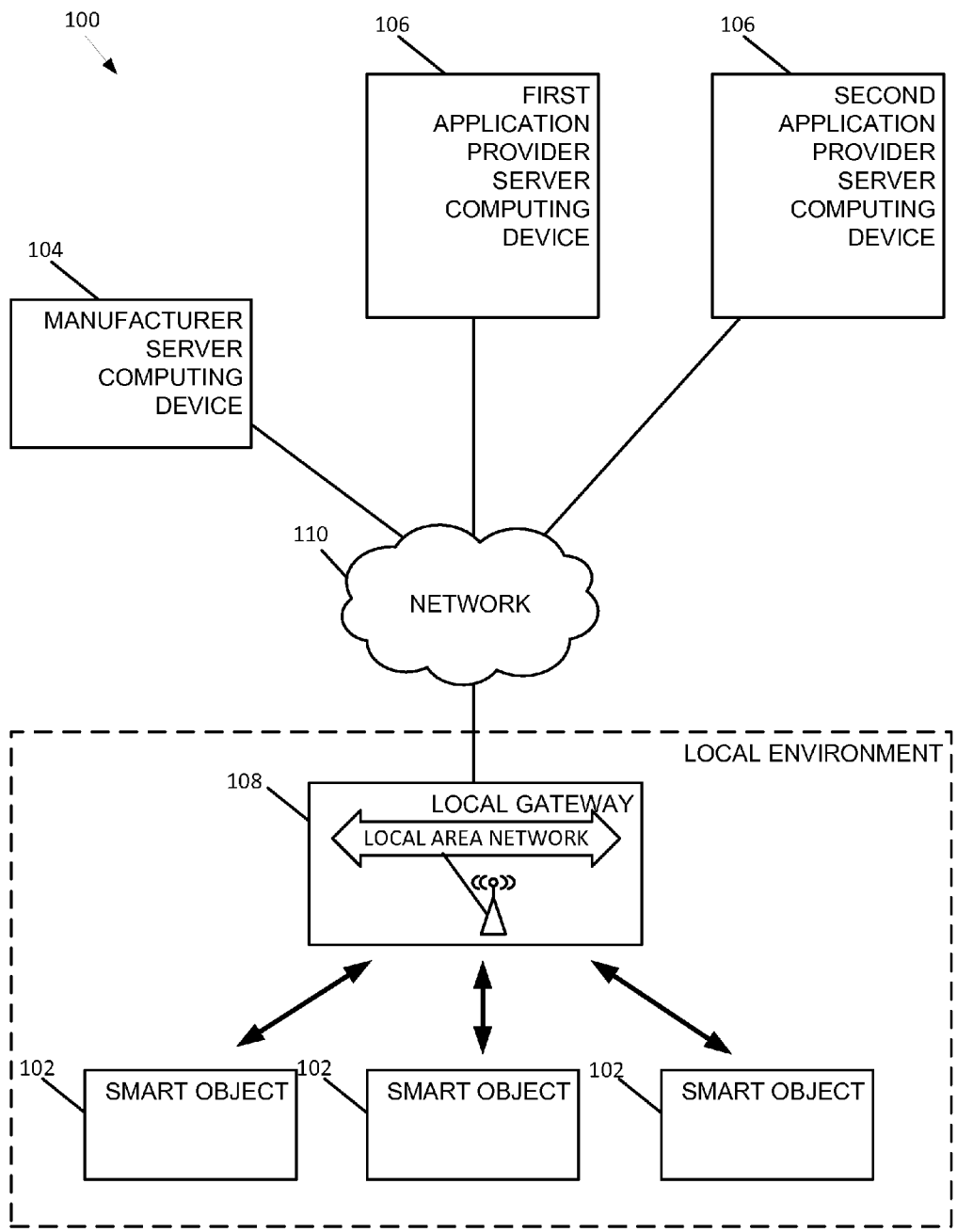
FIG. 1 illustrates an exemplary embodiment of a system for communicating between a smart object and an application provider server computing device.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure describes systems and methods for facilitating communication between a device and an application provider server computing device. In some embodiments a manufacturer server computing device is used to facilitate the communication. In some embodiments, the device is a smart object that provides network-based monitoring or control capabilities. In at least some embodiments, a smart object is an appliance, such as a water heater, furnace, or garage door, that can be monitored or controlled from a network-based application provider server computing device. In at least some other embodiments, a smart object monitors and controls a light or another electronic device that is connected to a power outlet. There are many other embodiments of smart objects as well.

In at least some embodiments, a smart object transmits measurements or status information and other data to an application provider server computing device through a network. Additionally, in at least some embodiments, a smart object receives commands or instructions from the application provider server computing device through the network. For example, in at least some embodiments, the application provider server computing device is a cloud server and is connected to the smart object through the Internet. In at least some other embodiments, the smart object connects to a different type of application provider server computing device over a different network or combination of networks.

In at least some embodiments, the smart object connects to the network through a secure gateway. In at least some embodiments, the secure gateway is a device that connects two networks (e.g., a local area network and a wide area network). Some example embodiments of the secure gateway include Wi-Fi (IEEE 802.11a/b/g/n) and Bluetooth access points and routers.

Further, in some embodiments, the smart object does not initially have an identifier for an application provider server computing device, and, therefore, the smart object is not capable of identifying a desired application provider server computing device. In at least some embodiments, the manufacturer server computing device has an identifier for an application provider server computing device and provides the identifier to the smart object upon request from the smart object.

In at least some embodiments, the smart object sends a request to the manufacturer server computing device to obtain an identifier for a predetermined application provider server computing device. In some embodiments, the smart object first sends its serial number to the manufacturer server computing device. In at least some embodiments, the manufacturer server computing device sends back a response including the identifier, and the smart object receives, and stores, the identifier. The smart objects then establishes connection with the application provider server computing device, using the identifier stored therein. In at least some embodiments, the identifier includes a URL and/or API key for an application provider server computing device.

In at least some embodiments, the smart object sends a descriptor thereof to the application provider server computing device. In at least some embodiments, the smart object periodically sends the descriptor to the application provider server computing device. In some embodiments, such a descriptor of the smart object includes a list and/or type of sensors, data collected by the sensors, and/or controls available on the application provider server computing device. The application provider server computing device receives, and stores, the descriptor of the smart object. In at least some embodiments, the application provider server computing device replies back and sends a web service descriptor for identifying applications or services that the application provider server computing device provides to consumers. In at least some embodiments, the application provider server computing device uses the smart object descriptor to provide various internet services or applications for consumers. In some embodiments, the consumers are the manufacturer of the smart object and/or consumers of the smart object.

In at least some embodiments, the internet services provided by the application provider server computing device include generating a dashboard identifying the smart object, presenting data transmitted from the smart object, and providing control options for interacting with the smart object. In some embodiments, when a consumer manipulates the control options to interact with the smart object, the application provider server computing device translates the consumer's actions to commands based upon the descriptor of the smart object and sends the commands to the smart object. In at least some embodiments, the commands are implemented by XML.

In at least some embodiments, the smart object periodically checks with the manufacturer server computing device and updates the identifier for the application provider server computing device. Thus, by changing the identifier stored in the manufacturer server computing device, it is possible to direct the smart object to refer to a different application provider server computing device.

In at least other embodiments, if the current application provider server computing device becomes invalid, thereby disallowing the smart object access thereto, the smart object can send a request to the manufacturer server computing device to obtain another identifier for a different application provider server computing device. Then, the smart object receives a second identifier for a second application provider server computing device from the manufacturer server computing device. In some embodiments, the manufacturer server computing device has a list of application provider server computing devices with different priority.

FIG. 1 illustrates an exemplary embodiment of a system 100 for communicating between a smart object and an application provider server computing device. The system 100 includes a smart object 102, a manufacturer server computing device 104, an application provider server computing device 106, a local gateway 108, and a network 110.

The smart object 102 is a device that operates to perform a predetermined function as well as interact with the application provider server computing device 106. The manufacturers or distributors that produce a device may want to equip the smart object 102 with various functions, such as remote controlling and remote monitoring. Thus, the manufacturers or distributors may produce a smart object 102 that can interact with the application provider server computing device 106.

The smart object 102 can be of any type. In at least some embodiments, the smart object 102 is used in a residential, commercial, or industrial environment. In at least some other embodiments, the smart object 102 is used in a different environment. Examples of the smart object 102 include, but not limited to, a water heater, furnace, or garage door.

In at least some embodiments, the smart object 102 transmits information to and receives information from the application provider server computing device 106 through the network 110. For example, in at least some embodiments, the smart object 102 transmits measurements or status information to the application provider server computing device 106 and receives instructions from the application provider server computing device 106.

In at least some embodiments, the smart object 102 is also configured to communicate with the manufacturer server computing device 104 through the network 110 to obtain an identifier for a predetermined application provider server computing device 106 with which the smart object 102 will communicate.

The manufacturer server computing device 104 operates to identify an application provider server computing device 106 to which the smart object 102 must be connected. In at least some embodiments, the manufacturer server computing device 104 sends an identifier for an application provider server computing device 106 to the smart object 102 upon request from the smart object 102.

In at least some embodiments, the manufacturer server computing device 104 is owned and/or operated by the same manufacturer or distributor that produces or distributes the smart objects 102 to consumers. Ownership and operation of the manufacturer server computing device 104 may also be by an entity other than the manufacturer in some embodiments. In some embodiments, the consumers are the manufacturer or distributor of the smart object. In other embodiments, the consumers are end-users or consumers of the smart object.

The application provider server computing device 106 interacts with the smart object 102 and provides one or more internet services and/or applications to the consumers. In at least some embodiments, the application provider server computing device 106 generates a dashboard that allows the consumers to identify the smart object 102, track data obtained at the smart objects 102, and instruct different operations of the smart object 102. In at least some embodiments, the consumers interact with the smart object 102 on personal computers or other computing devices, such as desktop computers, laptops, smartphones, tablets or other hand-held devices.

The local gateway 108 is a device that provides access to at least one of the manufacturer server computing device 104 and the application provider server computing device 106 through the network 110. In at least some embodiments, the local gateway 108 generates a secure wireless local area network and connects that wireless local area network to the network 110. In at least some embodiments, the local gateway 108 is a wireless router. Examples of wireless routers include the Linksys WRT54GL Wireless-G router from Linksys of Irvine, Calif. Other embodiments of the local gateway 108 are possible as well. For example, the local gateway can include a cellular communication device, an Ethernet communication device, or a variety of other communication devices. Some embodiments include multiple communication devices.

The network 110 communicates digital data between one or more computing devices, such as between the manufacturer server computing device 104 and the smart object 102 and between the application provider server computing device 106 and the smart object 102. Examples of the network 110 include a local area network and a wide area network, such as the Internet.

In some embodiments, the network 110 includes a wireless communication system, a wired communication system, or a combination of wireless and wired communication systems. A wired communication system can transmit data using electrical or optical signals in various possible embodiments. Wireless communication systems typically transmit signals via electromagnetic waves, such as in the form of optical signals or radio frequency (RF) signals. A wireless communication system typically includes an optical or RF transmitter for transmitting optical or RF signals, and an optical or RF receiver for receiving optical or RF signals. Examples of wireless communication systems include Wi-Fi communication devices (such as utilizing wireless routers or wireless access points), cellular communication devices (such as utilizing one or more cellular base stations), and other wireless communication devices.

Figure 2:
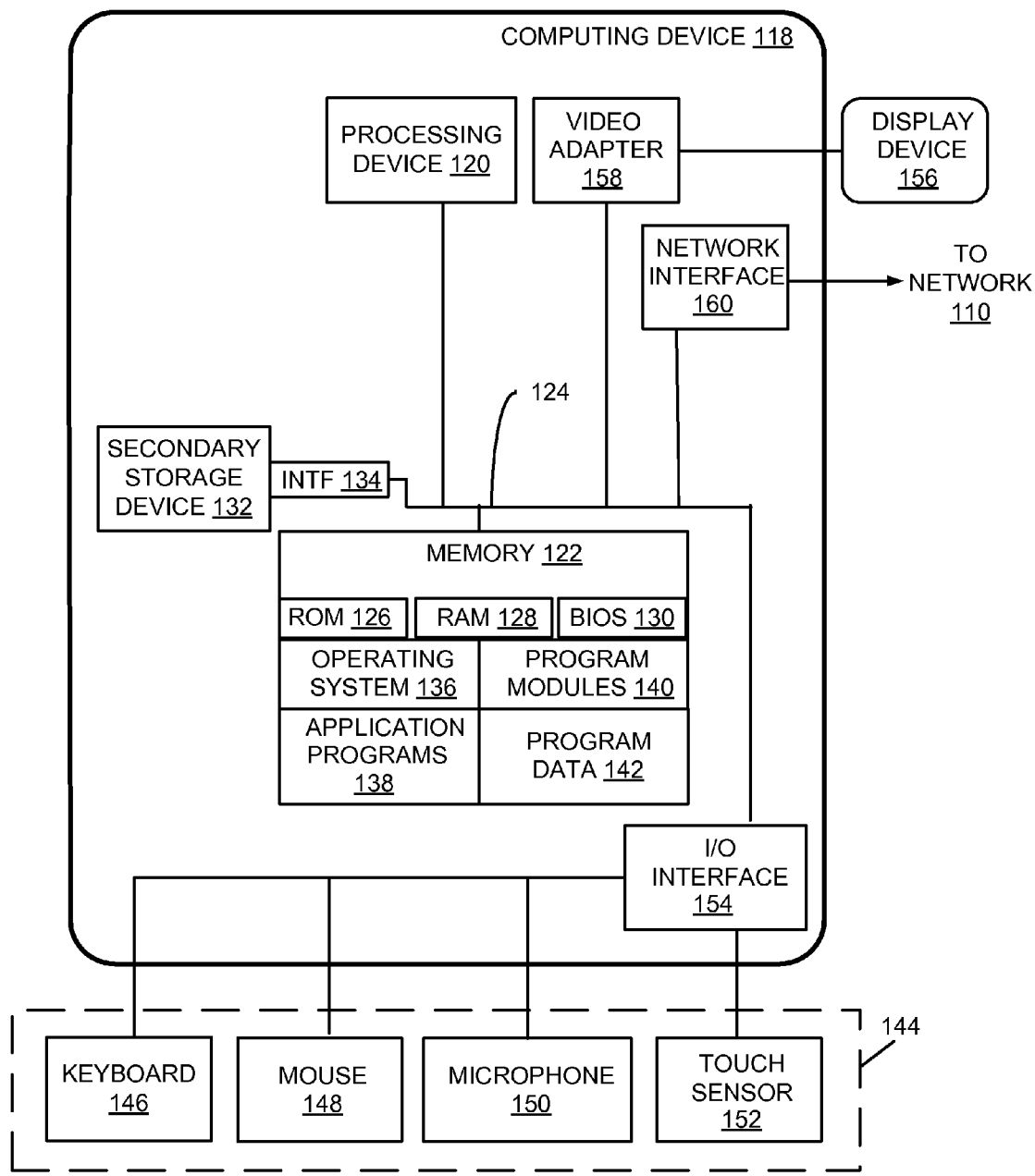
FIG. 2 illustrates an example architecture of a computing device.

FIG. 2 illustrates an exemplary architecture of a computing device that can be used to implement aspects of the present disclosure, including the smart object 102, the manufacturer server computing device 104, the application provider server computing device 106, and the local gateway 108 and will be referred to herein as the computing device 118. One or more computing devices, such as the type illustrated in FIG. 2, are used to execute the operating system, application programs, and software modules (including the software engines) described herein.

The computing device 118 includes, in at least some embodiments, at least one processing device 120, such as a central processing unit (CPU). A variety of processing devices are available from a variety of manufacturers, for example, Intel or Advanced Micro Devices. In this example, the computing device 118 also includes a system memory 122, and a system bus 124 that couples various system components including the system memory 122 to the processing device 120. The system bus 124 is one of any number of types of bus structures including a memory bus or memory controller, a peripheral bus, and a local bus using any of a variety of bus architectures.

Examples of computing devices suitable for the computing device 118 include a desktop computer, a laptop computer, a tablet computer, a mobile phone device such as a smart phone, or other devices configured to process digital instructions.

The system memory 122 includes read only memory 126 and random access memory 128. A basic input/output system 130 containing the basic routines that act to transfer information within computing device 118, such as during start up, is typically stored in the read only memory 126.

The computing device 118 also includes a secondary storage device 132 in some embodiments, such as a hard disk drive, for storing digital data. The secondary storage device 132 is connected to the system bus 124 by a secondary storage interface 134. The secondary storage devices and their associated computer readable media provide nonvolatile storage of computer readable instructions (including application programs and program modules), data structures, and other data for the computing device 118.

Although the exemplary environment described herein employs a hard disk drive as a secondary storage device, other types of computer readable storage media are used in other embodiments. Examples of these other types of computer readable storage media include magnetic cassettes, flash memory or other solid state memory technology, digital video disks, Bernoulli cartridges, compact disc read only memories, digital versatile disk read only memories, random access memories, or read only memories. Some embodiments include non-transitory media.

A number of program modules can be stored in a secondary storage device 132 or a memory 122, including an operating system 136, one or more application programs 138, other program modules 140, and program data 142. The data used by the computing device 118 may be stored at any location in the memory 122, such as the program data 142, or at the secondary storage device 132.

In some embodiments, computing device 118 includes input devices 144 to enable the caregiver to provide inputs to the computing device 118. Examples of input devices 144 include a keyboard 146, pointer input device 148, microphone 150, and touch sensor 152. A touch-sensitive display device is an example of a touch sensor. Other embodiments include other input devices 144. The input devices are often connected to the processing device 120 through an input/output interface 154 that is coupled to the system bus 124. These input devices 144 can be connected by any number of input/output interfaces, such as a parallel port, serial port, game port, or a universal serial bus. Wireless communication between input devices 144 and interface 154 is possible as well, and includes infrared, BLUETOOTH® wireless technology, 802.11a/b/g/n, cellular or other radio frequency communication systems in some possible embodiments.

In this example embodiment, a touch sensitive display device 156 is also connected to the system bus 124 via an interface, such as a video adapter 158. In some embodiments, the display device 156 is a touch sensitive display device. A touch sensitive display device includes sensor for receiving input from a user when the user touches the display or, in some embodiments, or gets close to touching the display. Such sensors can be capacitive sensors, pressure sensors, optical sensors, or other touch sensors. The sensors not only detect contact with the display, but also the location of the contact and movement of the contact over time. For example, a user can move a finger or stylus across the screen or near the screen to provide written inputs. The written inputs are evaluated and, in some embodiments, converted into text inputs.

In addition to the display device 156, the computing device 118 can include various other peripheral devices (not shown), such as speakers or a printer.

When used in a local area networking environment or a wide area networking environment (such as the Internet), the computing device 118 is typically connected to the network through a network interface, such as a wireless network interface 160. Other possible embodiments use other communication devices. For example, some embodiments of the computing device 118 include an Ethernet network interface, or a modem for communicating across the network.

The computing device 118 typically includes at least some form of computer-readable media. Computer readable media includes any available media that can be accessed by the computing device 118. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 118.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Figure 3:
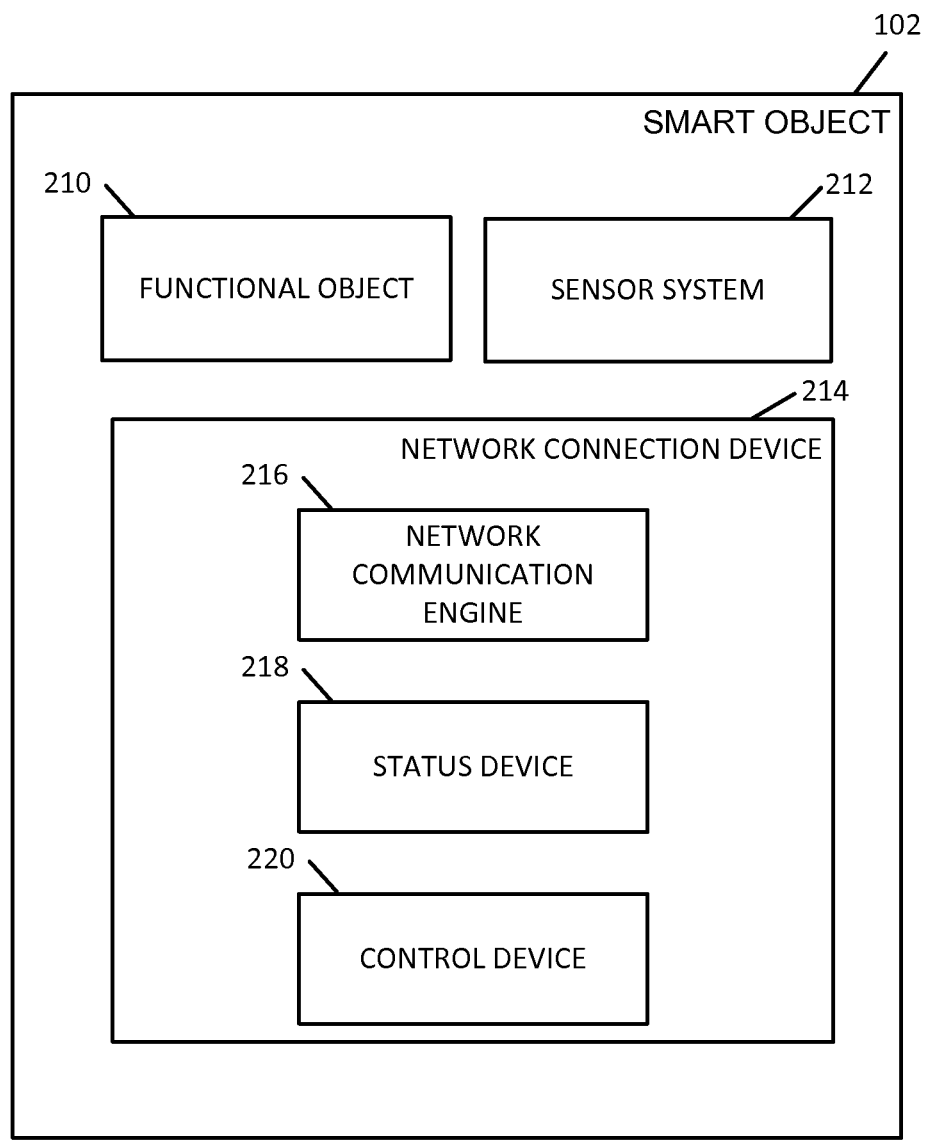
FIG. 3 illustrates an example smart object.

FIG. 3 illustrates an exemplary smart object 102. In at least some embodiments, the smart object 102 includes a functional object 210, a sensor system 212, and a network connection device 214. In at least some embodiments, the network connection device 214 includes a network communication engine 216, a status device 218 and a control device 220.

The functional object 210 is an object that performs a function. In at least some embodiments, the functional object 210 performs a function in a residential, commercial, industrial, natural, healthcare, or military environment. In at least some other embodiments, the functional object 210 performs in other environments. Examples of functional object 210 include water heaters, furnaces, electrical outlets, garage doors, trash compactors, refrigerators, air conditioners, animal traps, and medical devices. There are many other embodiments of the functional object 210 as well.

The sensor system 212 comprises one or more sensors configured to measure a property or status of the functional object 210. In at least some embodiments, the sensors are a component of the functional object 210. In at least some other embodiments, the sensors are external to the functional object 210 and measure properties or status that is not normally otherwise measured by the functional object 210. In at least some embodiments, the sensor system 212 monitors a temperature, humidity, pressure, and/or status (e.g., on/off) of the functional object 210. Other embodiments of the sensor system 212 are possible as well.

The network connection device 214 is a device that is configured to connect to, and communicate with, the manufacturer server computing device 104 and/or the application provider server computing device 106 through the network 110. In at least some embodiments, the network connection device 214 is a computing device.

The network communication engine 216 operates to connect to the network 110 through the local gateway 108 as well as to communicate with the manufacturer server computing device 104 and/or the application provider server computing device 106.

The status device 218 operates to indicate a status of the network connection device 214. In at least some embodiments, the status device 218 is controlled by the network communication engine 216 to indicate a network communication status. For example, in at least some embodiments, the status device 218 indicates that the network communication engine 216 is connected to the manufacturer server computing device 104 and/or the application provider server computing device 106 through the local gateway 108. Additionally, in at least some embodiments, the status device 218 operates to indicate an error condition in the network communication engine 216.

In at least some embodiments, the status device 218 comprises one or more devices that emit light. For example, in at least some embodiments, the status device 218 comprises one or more light-emitting diodes (LED). In at least some embodiments, the status device 218 operates to emit light a different character (e.g., a different intensity or different color) depending on whether the network communication engine 216 maintains a valid connection to the application provider server computing device 106. Additionally, in at least some embodiments, the status device 218 emits light of yet a different character to indicate an error condition in the network communication engine 216.

In at least some other embodiments, the status device 218 emits an audible sound to indicate at least some statuses of the network communication engine 216. For example, in at least some embodiments, the status device 218 emits a beep to indicate that the network communication engine 216 has successfully connected to the application provider server computing device 106. As another example, in at least some embodiments, the status device 218 emits multiple beeps to indicate that the network communication engine 216 has lost connection to the application provider server computing device 106.

Other embodiments of the status device 218 indicate a status in other ways as well. However, at least some embodiments of the network connection device 214 do not include the status device 218.

The control device 220 operates to receive an input from external to the network connection device 214. In at least some embodiments, the network communication engine 216 is configured to perform a certain action in response to the control device 220 receiving an input. For example, in at least some embodiments, the network connection device 214 is configured to communicate with the manufacturer server computing device 104 to obtain the identifier for an application provider server computing device 106 when the control device 220 receives an input.

In at least some embodiments, the control device 220 comprises one or more buttons or switches. Other embodiments of the control device 220 receive input in other ways as well. However, at least some embodiments of the network connection device 214 do not include the control device 220.

Figure 4:
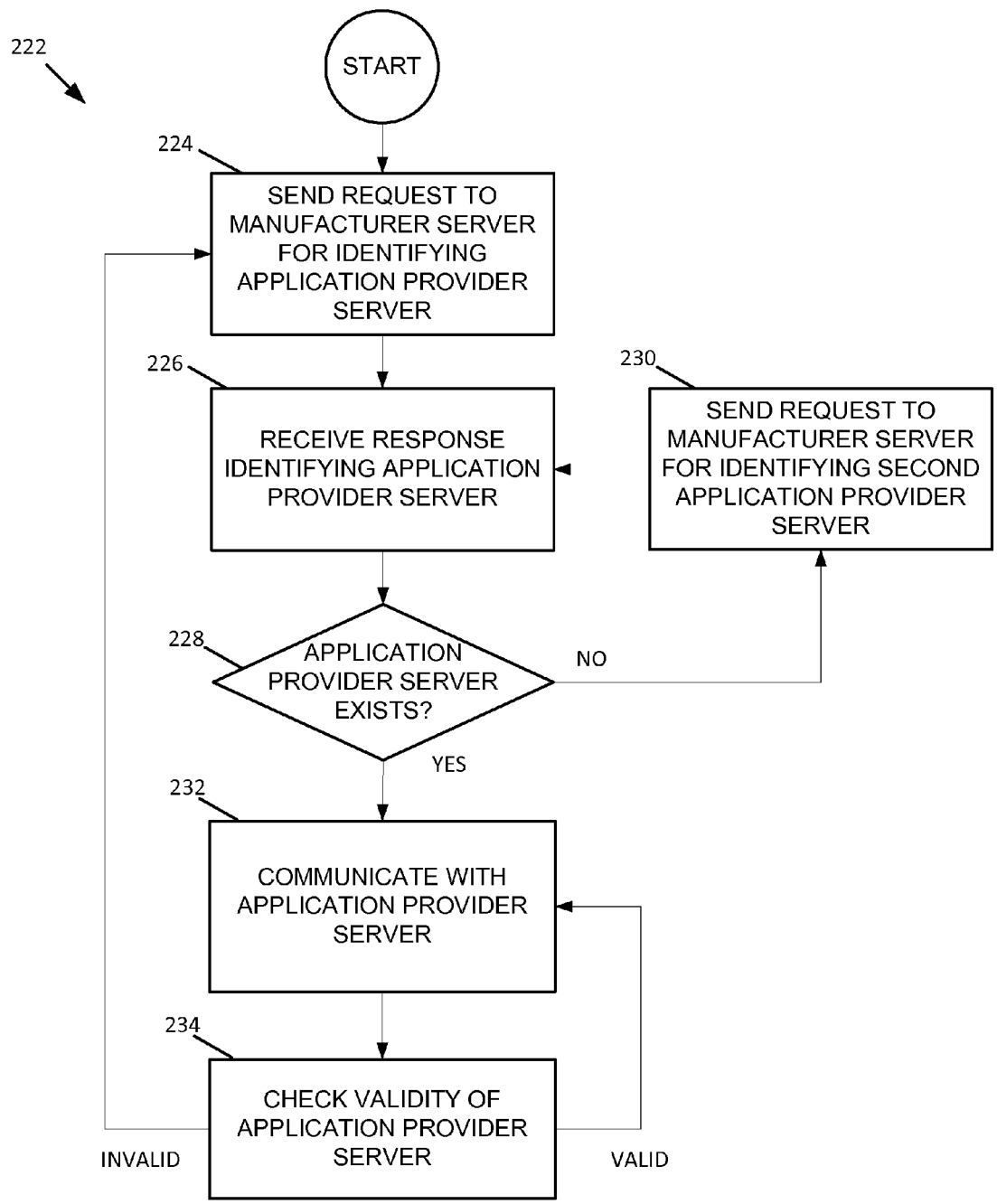
FIG. 4 is a flowchart illustrating an example method of operating a network communication engine of the smart object of FIG. 3.

FIG. 4 is a flowchart illustrating an example method 222 of operating the network communication engine 216. In this example, the method 222 includes operations 224, 226, 228, 230, 232 and 234. In some embodiments, the method 222 includes operations performed by a processor (such as the processing device 120, shown in FIG. 2). As used herein, methods include actions or operations that are performed by a user or executed by a computer, or combinations thereof. In some embodiments, information or data in the method 222 is transmitted over a HTTP or HTTPS protocol. For example, in at least some embodiments, such information or data is transmitted over HTTPS as an extensible markup language (XML) file.

At the operation 224, the network communication engine 216 sends a request to the manufacturer server computing device 104 to identify an application provider server computing device 106 with which the smart object 102 will subsequently communicate. In at least some embodiments, the network communication engine 216 establishes communication with the manufacturer server computing device 104 by using an identifier of the manufacturer server computing device 104. Such an identifier of the manufacturer server computing device 104 is stored in the storage device of the smart object 102.

In at least some embodiments, with the request, the network communication engine 216 transmits an identification number or serial number associated with the smart object 102 to the manufacturer server computing device 104. In at least some embodiments, the manufacturer server computing device 104 registers the smart object 102 after receiving the identification number. Further, in at least some embodiments, the manufacturer server computing device 104 looks up information, such as an owner and a location, using the identification number.

At the operation 226, the network communication engine 216 receives a response from the manufacturer server computing device 104. In at least some embodiments, the response includes an identifier for the appropriate application provider server computing device 106. In at least some embodiments, the identifier is stored in a storage device, such as the memory 122 or the secondary storage device 132, shown in FIG. 2. In at least some embodiments, the network communication engine 216 receives a URL and/or API key, as an identifier, associated with the application provider server computing device 106 to which the smart object 102 must be connected. In at least some embodiments, the API key is unique to each application provider server computing device 106. In at least some embodiments, the URL and API key are stored in a storage device (such as the memory 122) of the smart object 102.

At the operation 228, in at least some embodiments, it is determined whether the application provider server computing device 106 identified by the manufacturer server computing device 104 is accessible by the smart object 102.

If the smart object 102 attempts, but fails to connect to the application provider server computing device 106, the method 222 continues to the operation 230.

At the operation 230, the network communication engine 216 sends another request to the manufacturer server computing device 104 for obtaining an identifier for a different application provider server computing device 106. Then, the method 222 repeats the operation 226.

If the smart object 102 is able to connect to the application provider server computing device 106 based upon the identifier sent from the manufacturer server computing device 104, the method 222 continues to the operation 232.

At the operation 232, the network communication engine 216 establishes connection to the application provider server computing device 106. In at least some embodiments, the network communication engine 216 transmits measurements or status information and other data to the application provider server computing device 106 through the network 110. Additionally, in at least some embodiments, the network communication engine 216 receives commands or instructions from the application provider server computing device 106 through the network 110.

In at least some embodiments, the network communication engine 216 sends a smart object descriptor thereof to the application provider server computing device 106. In some embodiments, such a smart object descriptor includes a list and/or type of sensors, data collected by the sensors, and/or controls available on the application provider server computing device 106. The application provider server computing device 106 receives the smart object descriptor and refers to it to provide various internet services for consumers.

In at least some embodiments, the network communication engine 216 receives a web service descriptor that identifies services that the application provider server computing device 106 provides to consumers.

At the operation 234, in at least some embodiments, the network communication engine 216 checks the validity of the application provider server computing device 106. In at least some embodiments, the network communication engine 216 checks with the manufacturer server computing device 104 to see if the application provider server computing device 106 needs to be disconnected or replaced and, thus, the smart object 102 should refer to a different application provider server computing device 106. In at least some embodiments, the network communication engine 216 periodically checks with the manufacturer server computing device 104 and updates the identifier for the application provider server computing device 106.

In at least some embodiments, the network communication engine 216 sends a request to the manufacturer server computing device 104 to check the validity of the application provider server computing device 106. In some embodiments, the method 222 simply proceeds to the operation 224 and performs subsequent operations 226, 228, 230, and 232. For example, the network communication engine 216 sends a request to the manufacturer server computing device 104, and the network communication engine 216 receives a new identifier. If the new identifier is the same as the current one, the smart object 102 continues to communicate with the same application provider server computing device 106. If not, the smart object 102 is connected to a different application provider server computing device 106 associated with the new identifier.

If the current application provider server computing device 106 is determined to remain valid (for example, if the new identifier is the same as the current identifier), the network communication engine 216 continues to communicate with the application provider server computing device 106 (the operation 232). If not, the network communication engine 216 receives another identifier for a different application provider server computing device 106 (the operation 226).

In at least other embodiments, if the current application provider server computing device 106 becomes invalid, thereby disallowing the network communication engine 216 to access thereto, the network communication engine 216 can send a request to the manufacturer server computing device 104 to obtain another identifier for a different application provider server computing device 106. Then, the network communication engine 216 receives a second identifier for a second application provider server computing device 106 from the manufacturer server computing device 104. In some embodiments, to perform this operation, the manufacturer server computing device 104 has a list of application provider server computing devices with different priority.

Figure 5:
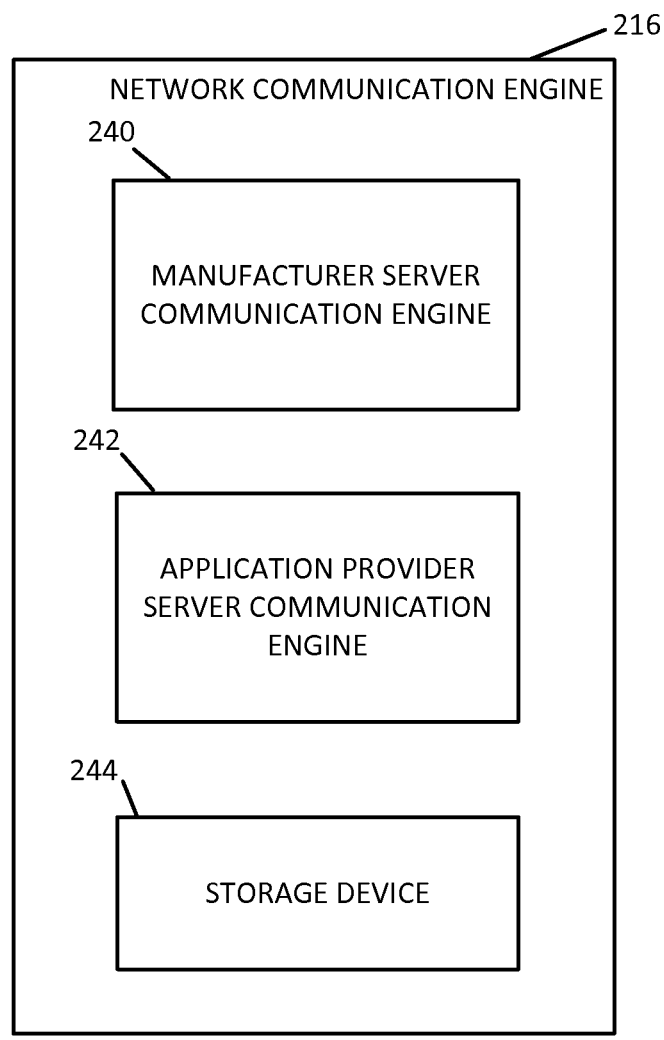
FIG. 5 is a schematic diagram of an example network communication engine of the smart object of FIG. 3.

FIG. 5 is a schematic diagram of the network communication engine 216 of the network connection device 214. In at least some embodiments, the network communication engine 216 includes a manufacturer server communication engine 240, an application provider server communication engine 242, and a storage device 244.

The manufacturer server communication engine 240 operates to communicate with the manufacturer server computing device 104. In at least some embodiments, the smart object 102 does not initially include an identifier that determines an application provider server computing device 106 with which the smart object 102 will communicate. In these cases, the manufacturer server computing device 104 stores the identifier and provides it to the smart object 102 to allow the smart object 102 to contact the application provider server computing device 106. Therefore, in at least some embodiments, the manufacturer server communication engine 240 is configured to communicate with the manufacturer server computing device 104 to identify an application provider server computing device 106 to which the smart object 102 will subsequently connect to and communicate with through the network 110. An example of the manufacturer server communication engine 240 is described in further detail with reference to FIGS. 6 and 7.

The application provider server communication engine 242 operates to communicate with the application provider server computing device 106. In at least some embodiments, the application provider server communication engine 242 transmits measurements of status information and/or other data obtained at the smart object 102 to the application provider server computing device 106. In addition, in at least some embodiments, the application provider server communication engine 242 receives commands or instructions from the application provider server computing device 106. An example of the application provider server communication engine 242 is described in further detail with reference to FIG. 8.

The storage device 244 operates to store different pieces of information or data that is either obtained from or sent to the manufacturer server communication engine 240 and/or the application provider server communication engine 242, and may also store any other data generated by or received by the smart object 102, such as data from the sensor system 212 (FIG. 3). In at least some embodiments, an example or the storage device 244 is the memory 122 and/or the secondary storage device 132, as shown in FIG. 2.

In at least some embodiments, the storage device 244 stores information on the smart object 102, such as a serial number or identification number, type and/or other properties. In addition, at least some embodiments, the storage device 244 stores data collected by the sensor system 212. Also, at least some embodiments, the storage device 244 includes an identifier for an application provider server computing device 106, which is received from the manufacturer server computing device 104 upon request of the smart object 102. Further, at least some embodiments, the storage device 244 stores a web service descriptor transmitted from the application provider server computing device 106. An example of data stored in the storage device 244 is described below with reference to FIG. 9.

Figure 6:
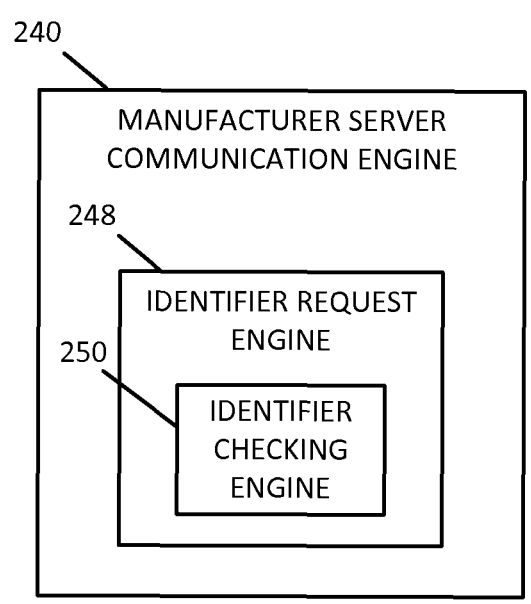
FIG. 6 is a schematic diagram of an example manufacturer server communication engine.

FIG. 6 is a schematic diagram of an example manufacturer server communication engine 240 of FIG. 5. In at least some embodiments, the manufacturer server communication engine 240 includes an identifier request engine 248. In at least some embodiments, the identifier request engine 248 includes an identifier checking engine 250.

The identifier request engine 248 operates to send the manufacturer server computing device 104 a request for an identifier for an application provider server computing device 106 with which the smart object 102 will communicate. In addition, in at least some embodiments, the identifier request engine 248 receives a response including the identifier from the manufacturer server computing device 104.

In at least some embodiments, the identifier request engine 248 reads the serial number of the smart object 102 from the storage device 244 and sends the serial number to the manufacturer server computing device 104 with a request for an identifier. In addition, in at least some embodiments, the identifier request engine 248 receives the identifier from the manufacturer server computing device 104 and stores it in the storage device 244.

In at least some embodiments, the identifier includes a URL of the application provider server computing device 106 for the smart object 102. In addition, or alternatively, in at least some embodiments, the identifier includes an API key for the application provider server computing device 106.

In at least some embodiments, the identifier checking engine 250 of the identifier request engine 248 operates to check with the manufacturer server computing device 104 to update the identifier. Thus, when the identifier stored in the manufacturer server computing device 104 is modified for some reasons, the identifier check engine 250 recognizes the modified identifier, thereby leading the smart object 102 to refer to a different application provider server computing device 106 that is represented by the modified identifier. As such, a consumer, such as the manufacturer or distributor of the smart object 102, or a consumer or end-user of the smart object 102, need not modify or update the configuration of the smart object 102 when it is necessary to replace or disconnect the current application provider server computing device 106. The manufacturer or distributor of the smart object 102 is only required to update the manufacturer server computing device 104 that is controlled or operated by the manufacture or distributor.

In at least some embodiments, the identifier checking engine 250 is periodically operated. In at least other embodiments, the identifier checking engine 250 is operated when requested by the consumer, such as a manufacturer, distributor, end-user, and/or consumer of the smart object 102.

Figure 7:
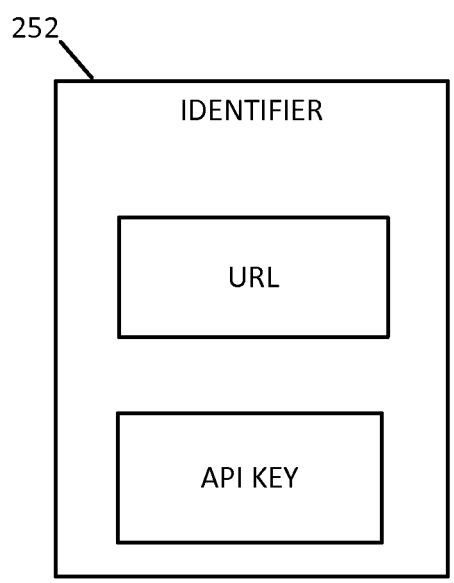
FIG. 7 is an example identifier transmitted from a manufacturer server computing device to an identifier request engine.

FIG. 7 is an example identifier 252 that the identifier request engine 248 receives from the manufacturer server computing device 104. In at least some embodiments, the identifier 252 includes a Uniform Resource Locator (URL) and an Application Programming Interface (API) key of an application provider server computing device 106 with which the smart object 102 will communicate. In some embodiments the API key is provided for communication involving the HTTP communication protocol. In at least other embodiments, the identifier 252 can be of other types suitable for the smart object 102 to identify a predetermined application provider server computing device 106.

In some embodiments the URL includes an Internet address for the application provider server computing device. An example of a URL is www.example.com.

In some embodiments, the API key is provided. As one example, the API key is an identifier, such as an authentication key, for using an application programming interface provided by the application server computing device. In at least some embodiments, the API key also identifies the vendor, model, and serial number of the device that is using it. In at least some embodiments, the API key is temporary and can be regenerated and re-shared between the application provider server computing device, the manufacturer server computing device, and the smart object without disrupting the flow of data.

Figure 8:
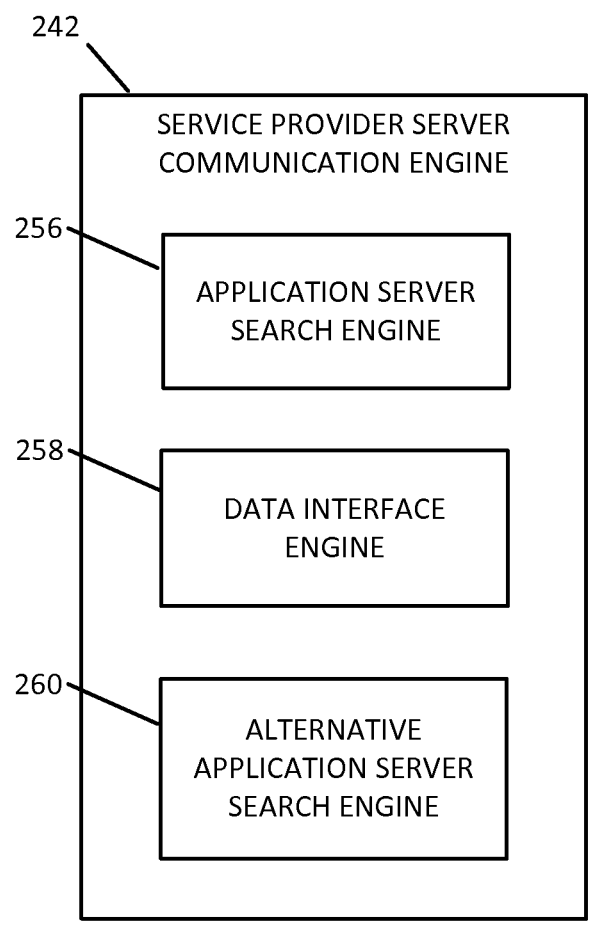
FIG. 8 is a schematic diagram of an example application provider server communication engine.

FIG. 8 is a schematic diagram of an example application provider server communication engine 242 of FIG. 5. In at least some embodiments, the application provider server communication engine 242 includes an application server search engine 256, a data interface engine 258, and an alternative application server search engine 260.

The application server search engine 256 operates to establish connection to the application provider server computing device 106, using the identifier stored in the storage device 244.

In at least some embodiments, the application server search engine 256 sends a descriptor of the smart object 102 to the application provider server computing device 106. In at least some embodiments, the descriptor of the smart object includes a list and/or type of sensors, data collected by the sensors, and/or controls available on the application provider server computing device. The smart object descriptor is used at the application provider server computing device 106 to provide various internet services for consumers. In at least some embodiments, the application server search engine 256 periodically sends the descriptor to the application provider server computing device 106.

In at least some embodiments, the application server search engine 256 receives a web service descriptor from the application provider server computing device 106 and stores it in the storage device 244. In at least some embodiments, the web service descriptor is used at the data interface engine 258 to identify internet services or applications provided by the application provider server computing device 106 and to selectively send data required for the services to the application provider server computing device 106.

The data interface engine 258 operates to transmit measurements and status information to the application provider server computing device 106. For example, in at least some embodiments, the data interface engine 258 transmits measurements recorded by the sensor system 212 to the application provider server computing device 106. In at least some embodiments, the data interface engine 258 periodically sends the measurement and status information to the application provider server computing device 106.

Additionally, in at least some embodiments, the data interface engine 258 operates to receive commands or instructions and data from the application provider server computing device 106.

The alternative application server search engine 260 operates to find a different application provider server computing device 106 if the current application provider server computing device 106 becomes invalid and denies access from the smart object 102 for some reasons. In at least some embodiments, the alternative application server search engine 260 communicates with the manufacturer server computing device 104 through the manufacturer server communication engine 240, which sends a request to the manufacturer server computing device 104 to obtain another identifier for a different application provider server computing device 106. In at least some embodiments, such an alternative application provider server computing device 106 is determined based upon a list of application provider server computing devices with different priority, which can be stored in the manufacturer server computing device 104 (FIG. 12).

FIG. 9 illustrates an example measurement data 262 obtained by the sensor system 212 and stored in the storage device 244 of the smart object 102. In at least some embodiments, the measurement data 262 is represented by a data table 264.

In a non-limiting example, the data table 264 shows the variation of temperature and humidity of the smart object 102 with respect to time. The type of data detected by the sensor system 212 can be varied according to various factors, such as, but not limited to, the type of the smart object 102 and/or the sensors embedded in the smart object 102.

Figure 10:
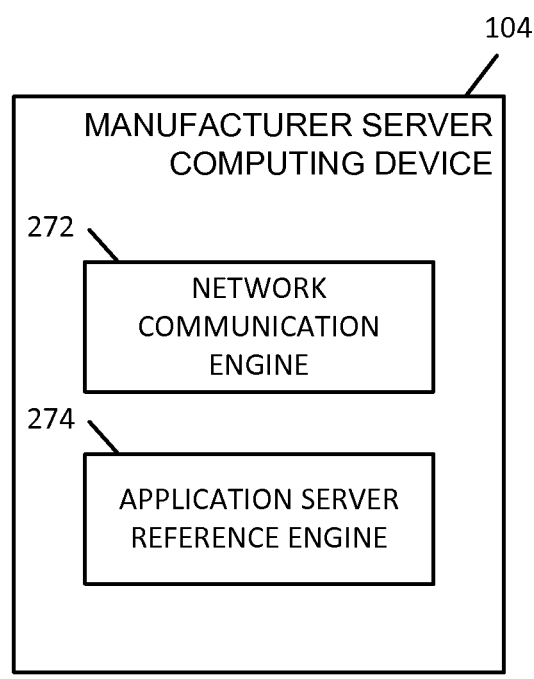
FIG. 10 illustrates an exemplary manufacturer server computing device.

FIG. 10 illustrates an exemplary manufacturer server computing device 104. In at least some embodiments, the manufacturer server computing device 104 includes a network communication engine 272 and an application server reference engine 274.

The network communication engine 272 operates to connect to the smart object 102 through the network 110. In at least some embodiments, the network communication engine 272 is connected to the network communication engine 216 of the smart object 102.

The application server reference engine 274 operates to provide the smart object 102 with the identifier for a proper application provider server computing device 106. In at least some embodiments, when the smart object 102 sends the manufacturer server computing device 104 a request for an identifier for an application provider server computing device 106, the application server reference engine 274 returns a response including the identifier for an application provider server computing device 106 with which the smart object 102 will communicate.

In at least some embodiments, when the smart object 102 sends its serial number to the manufacturer server computing device 104 with a request for an identifier, the application server reference engine 274 verifies the smart object 102 with the serial number and determines a proper application provider server computing device 106 for the smart object 102. In at least some embodiments, the manufacturer or distributor of the smart object 102 can access the manufacturer server computing device 104 to modify an identifier that is to be assigned to a particular smart object 102.

In at least some embodiments, the application server reference engine 274 includes a priority list 281 of application provider server computing devices 106 for a particular smart object 102 with different priority. The priority list 281 is described below with reference to FIG. 12.

Figure 11:
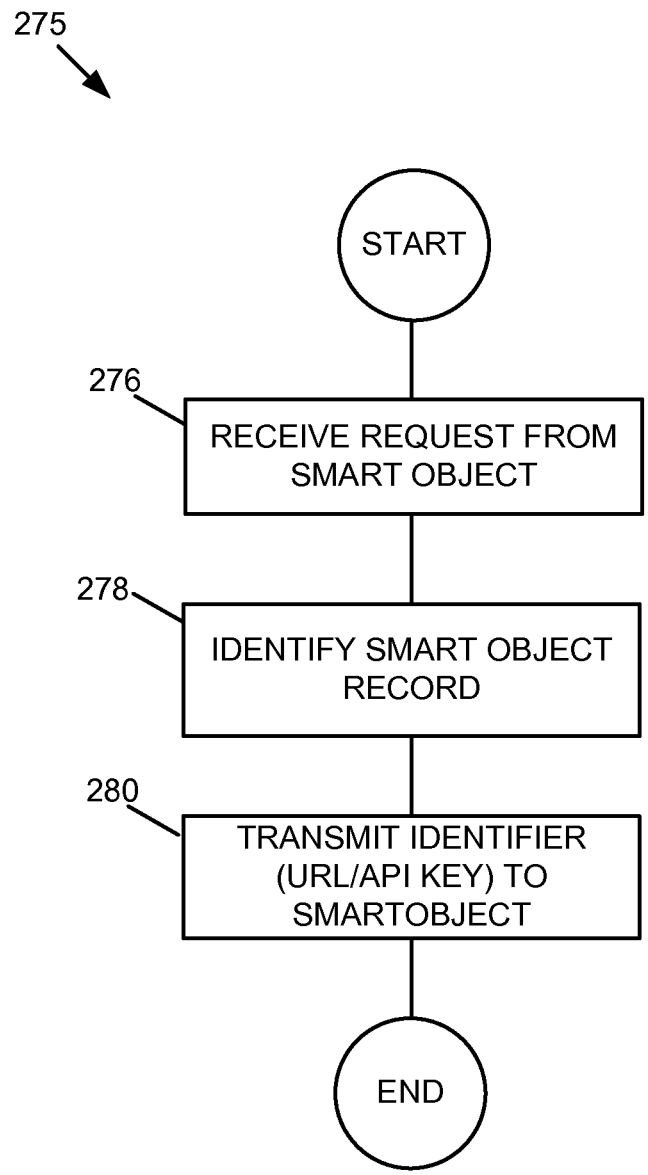
FIG. 11 is a flowchart illustrating an example method of operating an application server reference engine of the manufacturer server computing device of FIG. 10.

FIG. 11 is a flowchart illustrating an example method 275 of operating the application server reference engine 274 of FIG. 10. In this example, the method 275 includes operations 276, 278 and 280. In some embodiments, the method includes operations that are performed by a processor (such as the processing device 120, shown in FIG. 2). As used herein, methods include actions or operations that are performed by a user or executed by a computer, or combinations of these. In some embodiments, information or data in the method 222 is transmitted over a HTTP or HTTPS protocol. For example, in at least some embodiments, such information or data is transmitted over HTTPS as an extensible markup language (XML) file.

At the operation 276, the application server reference engine 274 receives a request from the smart object 102 for identifying an application provider server computing device 106 suitable for the smart object 102. In at least some embodiments, the smart object 102 sends the ID or serial number to the application server reference engine 274 over using a web service provided by the manufacturer server computing device 104. For example, in at least some embodiments, the smart object 102 transmits the ID or serial number using a HTTP POST or HTTP GET request.

At the operation 278, the application server reference engine 274 identifies a record associated with the smart object 102 using the ID or serial number that was received in the operation 276. In at least some embodiments, the application server reference engine 274 identifies the record associated with the smart object 102 by querying a database for smart object records with the specified ID or serial number. However, other embodiments are possible as well.

At the operation 280, the application server reference engine 274 returns a response including the identifier for an application provider server computing device 106 with which the smart object 102 will communicate. In at least some embodiments, the identifier includes a URL and API key of the application provider server computing device 106.

FIG. 12 illustrates an example priority list 281 of application provider server computing devices 106 with different priority. In at least some embodiments, the priority list 281 shows different levels of priority and a plurality of application provider server computing devices 106 associated with each level of priority.

The priority list 281 operates to represent the order of application provider server computing devices 106 when a prior application provider server computing device 106 is unavailable or inappropriate for the smart object 102. For example, if the smart object 102 fails to access application provider server computing device A, the smart object 102 sends a request for another application provider server computing device, and the manufacturer server computing device 104 (for example, the application server reference engine 274) determines from the priority list 281 that application provider server computing device B should be assigned to the smart object 102, and responds to the request with the identifier (such as URL and/or API key) for application provider server computing device B.

Figure 13:
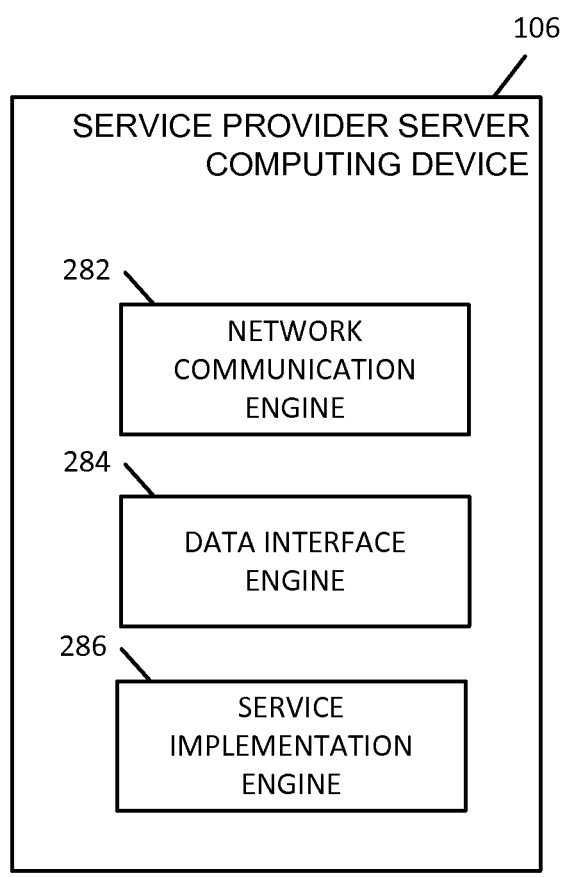
FIG. 13 illustrates an exemplary application provider server computing device.

FIG. 13 illustrates an exemplary application provider server computing device 106. In at least some embodiments, the application provider server computing device 106 includes a network communication engine 282, a data interface engine 284 and a service implementation engine 286.

The network communication engine 282 operates to connect to the smart object 102 through the network 110. In at least some embodiments, the network communication engine 282 is connected to the network communication engine 216 of the smart object 102.

In as least some embodiments, the network communication engine 282 receives a descriptor of the smart object 102 and stores it in the storage device of the application provider server computing device 106. As described above, the descriptor of the smart object includes a list and/or type of sensors, data collected by the sensors, and/or controls available on the application provider server computing device. In at least some embodiments, the smart object descriptor is used at the service implementation engine 286 to provide various internet services for consumers, such as to generate a dashboard 300 (FIG. 15) identifying the smart object 102 and control interfaces, such as buttons, text inputs and graphs, to allow consumers to interact with the smart object 102.

In addition, in at least some embodiments, the network communication engine 282 sends a web service descriptor to the smart object 102 to inform the smart object 102 of a list, nature, and/or type of internet services provided by the application provider server computing device 106. In at least some embodiments, based upon the web service descriptor received, the smart object 102 sends measurement and/or status information required for providing the internet services as intended by the application provider server computing device 106.

The data interface engine 284 operates to receive measurements and status information of the smart object 102 from the smart object 102. In at least some embodiments, the data interface engine 284 communicates with the data interface engine 258 of the smart object 102 and receives measurements recorded by the sensor system 212 of the smart object 102. In at least some embodiments, the smart object 102 sends measurements or status updates according to the smart object descriptor to the data interface engine 284. Then, the data interface engine 284 operates to translate the received data based upon the smart object descriptor and uses the translated data for internet services. For example, as discussed below, the service implementation engine 286 can update representations in a dashboard 300 (FIG. 15) to reflect the updated measurements or status.

Additionally, in at least some embodiments, the data interface engine 284 operates to send commands or instructions and data from the application provider server computing device 106 to the smart object 102 (for example, the data interface engine 258 of the smart object 102). As described below, in at least some embodiments, the application provider server computing device 106 provides a dashboard 300 (FIG. 15) including a user interface for receiving control commands or instructions from a consumer who wants to control the smart object 102. Thus, in at least some embodiments, when the consumer selects one or more control options on the dashboard 300, the data interface engine 284 translates the consumer's action to commands based upon the smart object descriptor and sends the commands to the smart object 102. In at least some embodiments, the commands are implemented in XML.

The service implementation engine 286 operates to provide various internet services to consumers. In providing the internet services, the service implementation engine 286 refers to the smart object descriptor received by the network communication engine 282 and uses the measurement and/or status information associated with the smart object 102, which is received by the data interface engine 284.

In at least some embodiments, the internet services include a dashboard accessible by a consumer, such as a manufacturer or distributor or a consumer or end-user. An example of the dashboard is described in further detail with reference to FIG. 15.

Figure 14:
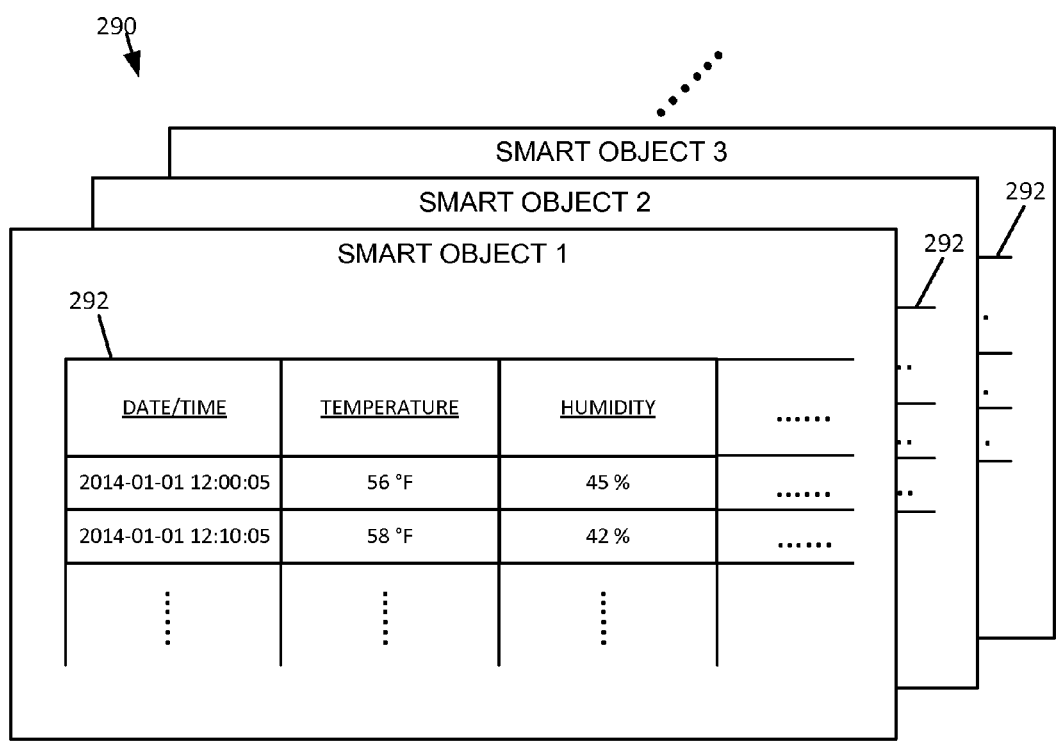
FIG. 14 illustrates an example measurement data stored in the application provider server computing device of FIG. 13.

FIG. 14 illustrates an example measurement data 290 received from the smart object 102 and stored in a storage device (such as the memory 122 and/or the secondary storage device 132, shown in FIG. 2) of the application provider server computing device 106. In at least some embodiments, the measurement data 290 is represented by a plurality of data tables 292 when the application provider server computing device 106 communicates with a plurality of smart objects 102.

In at least some embodiments, each of the data tables 292 represents the measurements from each smart object 102. By way of example, in a non-limiting example, the data tables 292 show the variation of temperature and humidity of the smart object 102 with respect to time. The type of data detected by the sensor system 212 can be varied according to various factors, such as, but not limited to, the type of the smart object 102 and/or the sensors embedded in the smart object 102.

Figure 15:
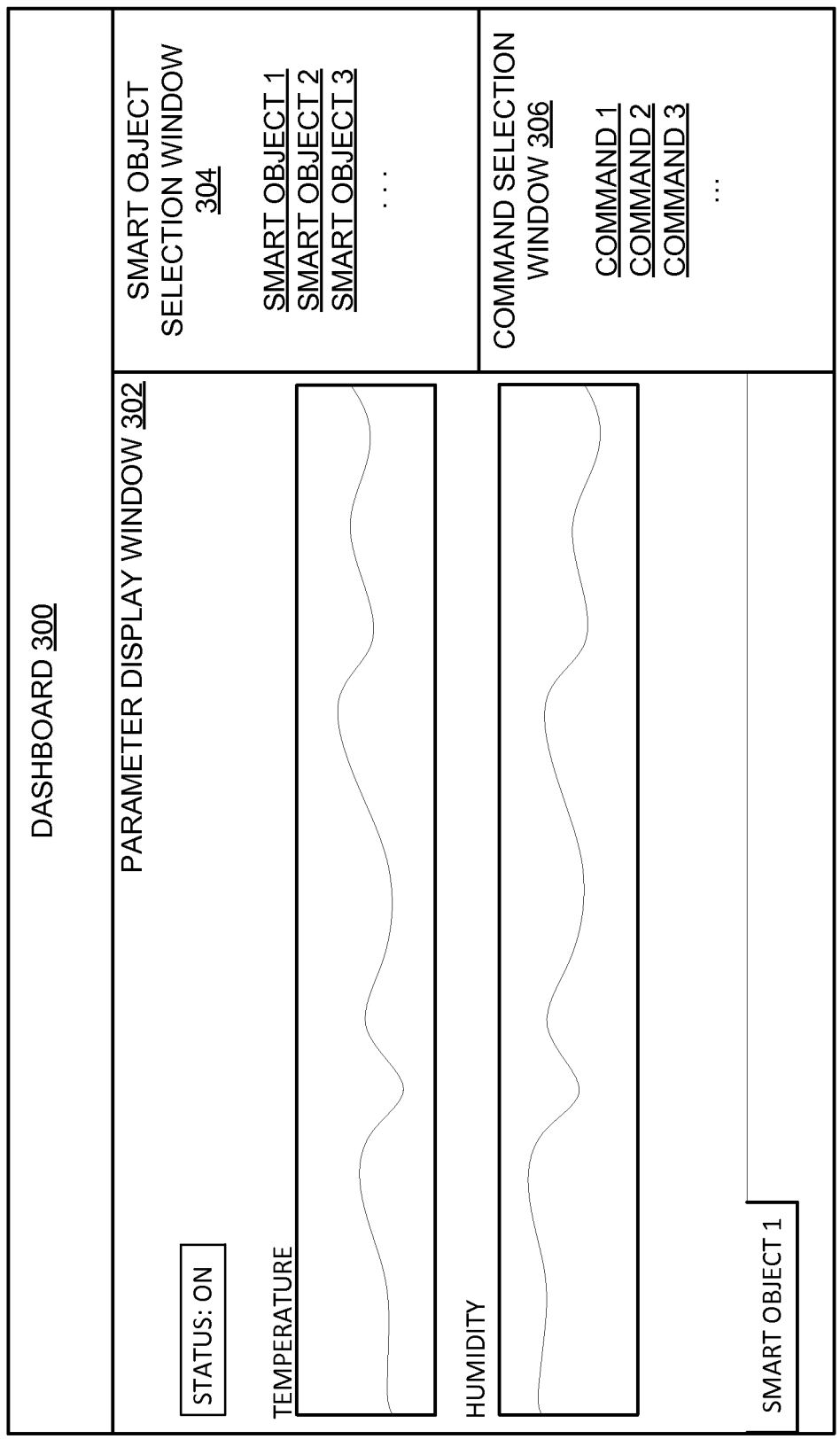
FIG. 15 is a schematic view of an example dashboard provided by the application provider server computing device of FIG. 13.

FIG. 15 is a schematic view of an example dashboard 300 provided by the application provider server computing device 106.

The dashboard 300 is configured to allow consumers to monitor, and/or control, the measurements and/or status of the smart object 102. In at least some embodiments, the dashboard 300 provides a visual representation of the measurement and/or status associated with the smart object 102. In at least other embodiments, the dashboard 300 also provides a user interface that allows a consumer to input various instructions to control the smart object 102. Examples of such control include turning on/off of the smart object 102 or of a particular sensor system 212 thereof.

The dashboard 300 can be of any type. For example, the dashboard 300 is implemented as a stand-alone software application, a web-browser based application, or a desktop application.

In at least some embodiments, the dashboard 300 includes a parameter display window 302, a smart object selection window 304, and a command selection window 306.

In at least some embodiments, the parameter display window 302 operates to display the measurements obtained at the smart object 102 and/or the status of the smart object 102. In the depicted, non-limiting example, the parameter display window 302 indicates that the status of the smart object 1 is turned on, and displays the visual representations of the temperature and humidity at the smart object 102.

In at least some embodiments, the smart object selection window 304 operates to allow a consumer to select different smart objects with which the consumer wants to interact.

In at least some embodiments, the command selection window 306 operates to provide the consumer with various control options for interacting with the smart object 102. For example, the command selection window 306 provides a user interface that allows the consumer to select commands or instructions as the consumer wants.

In at least other embodiments, the dashboard 300 can provide other windows for interacting with the smart object 102. Further, the arrangement of the windows is not limited to the depicted example herein, and can be varied to meet different technical demands and/or consumer's needs.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of establishing communication between a smart object and an application provider server computing device, the method comprising:
    sending a request from the smart object to a first server computing device, the first server computing device storing a list of application provider server computing devices that provide services associated with the smart object, the application provider server computing devices including a second server computing device;
    receiving, by the smart object, a response from the first server computing device, the response including a first identifier indicating the second server computing device; and
    establishing communication between the smart object and the second server computing device based upon the first identifier.

2. The method of claim 1, wherein sending the request from the smart object to the first server computing device comprises:
    sending an identification number of the smart object from the smart object to the first server computing device; and
    verifying the smart object based upon the identification number at the first server computing device.

3. The method of claim 1, further comprising:
    resending the request from the smart object to the first server computing device to determine whether to continue communication between the smart object and the second server computing device.

4. The method of claim 3, further comprising:
    receiving, by the smart object, a second identifier indicating a third server computing device if the communication between the smart object and the second server computing device is determined to be discontinued; and
    establishing communication between the smart object and the third server computing device based upon the second identifier, wherein the third server computing device provides consumers with internet services associated with the smart object.

5. The method of claim 1, further comprising:
    resending the request from the smart object to the first server computing device if communication between the smart object and the second server computing device fails;
    receiving, by the smart object, a second identifier indicating a third server computing device; and
    establishing communication between the smart object and the third server computing device based upon the second identifier, wherein the third server computing device provides consumers with internet services associated with the smart object.

6. The method of claim 1, further comprising:
    sending a smart object descriptor from the smart object to the second server computing device; and
    receiving, by the smart object, a web service descriptor from the second server computing device.

7. The method of claim 1, further comprising:
transmitting information associated with the smart object from the smart object to the second server computing device; and
transmitting an instruction for the smart object from the second server computing device to the smart object.

8. A smart object comprising:
a functional object configured to perform a function;
a sensor system configured to measure a property of the functional object; and
a network communication engine comprising:
a central processing unit that is configured to control the network communication engine;
a computer readable data storage medium storing software instructions that, when executed by the central processing unit, cause the network communication engine to:
send a request to a first server computing device, the first server computing device storing a list of application provider server computing devices that provide services associated with the smart object, the application provider server computing devices including a second server computing device;
receive a response from the first server computing device, the response including a first identifier indicating the second server computing device; and
establish communication with the second server computing device based upon the first identifier.

9. The smart object of claim 8, wherein the software instructions further cause the network communication engine to:
resend the request from the smart object to the first server computing device to determine whether to continue communication between the smart object and the second server computing device.

10. The smart object of claim 9, wherein the software instructions further cause the network communication engine to:
receive a second identifier indicating a third server computing device if the communication between the smart object and the second server computing device is determined to be discontinued; and
establish communication with the third server computing device based upon the second identifier, wherein the third server computing device provides consumers with internet services associated with the smart object.

11. The smart object of claim 8, wherein the software instructions further cause the network communication engine to:
resend the request from the smart object to the first server computing device if communication between the smart object and the second server computing device fails;
receive a second identifier indicating a third server computing device; and
establish communication with the third server computing device based upon the second identifier, wherein the third server computing device provides consumers with internet services associated with the smart object.

12. The smart object of claim 8, wherein the software instructions further cause the network communication engine to:
send a smart object descriptor to the second server computing device; and
receive a web service descriptor from the second server computing device.

13. The smart object of claim 8, wherein the software instructions further cause the network communication engine to:
transmit information associated with the smart object to the second server computing device; and
receive an instruction for the smart object from the second server computing device.

14. A system for establishing communication between a smart object and an application provider server computing device, the system comprising:
at least one processing device configured to control the system; and
a computer readable data storage medium storing a list of application provider server computing devices that provide services associated with a smart object, the computer readable data storage medium storing software instructions that, when executed by the at least one processing device, cause the system to:
receive a request from the smart object;
identify at least one of the application provider server computing device available for communication with the smart object; and
transmit a response to the smart object, the response including a first identifier indicating the at least one of the application provider server computing devices, wherein the smart object establishes communication with the at least one of the application provider server computing devices based upon the first identifier.

15. The system of claim 14, wherein the software instructions further cause the system to:
receive smart object identification information from the smart object; and
verify the smart object based on the smart object identification information.

16. The system of claim 14, wherein the software instructions further cause the system to:
receive a request from the smart object, the request for determining whether to continue communication between the smart object and the at least one of the application provider server computing devices.

17. The system of claim 16, wherein the software instructions further cause the system to:
transmit a second identifier to the smart object, the second identifier for indicating at least one other application provider server computing device if the communication between the smart object and the at least one of the application provider server computing devices is determined to be discontinued,
wherein the smart object establishes communication with the at least one other application provider server computing device based upon the second identifier.

18. The system of claim 14, wherein the software instructions further cause the system to:
receive a request from the smart object if communication between the smart object and the at least one of the application provider server computing devices fails; and
transmit a second identifier to the smart object, the second identifier for indicating at least one other application provider server computing device,
wherein the smart object establishes communication with the at least one other application provider server computing device based upon the second identifier.

19. The method of claim 1, wherein the list of application provider server computing devices includes a priority list of application provider server computing devices.

20. The system of claim 14, wherein the list of application provider server computing devices includes a priority list of application provider server computing devices.

* * * * *